3,164,157
FILTER TYPE CIGARETTE AND METHOD
OF MAKING SAME
Herbert A. Lebert, Millbrae, Calif., assignor to MacFarland, Aveyard & Company, Chicago, Ill., a corporation of Delaware
Filed Feb. 15, 1961, Ser. No. 91,568
4 Claims. (Cl. 131—10)

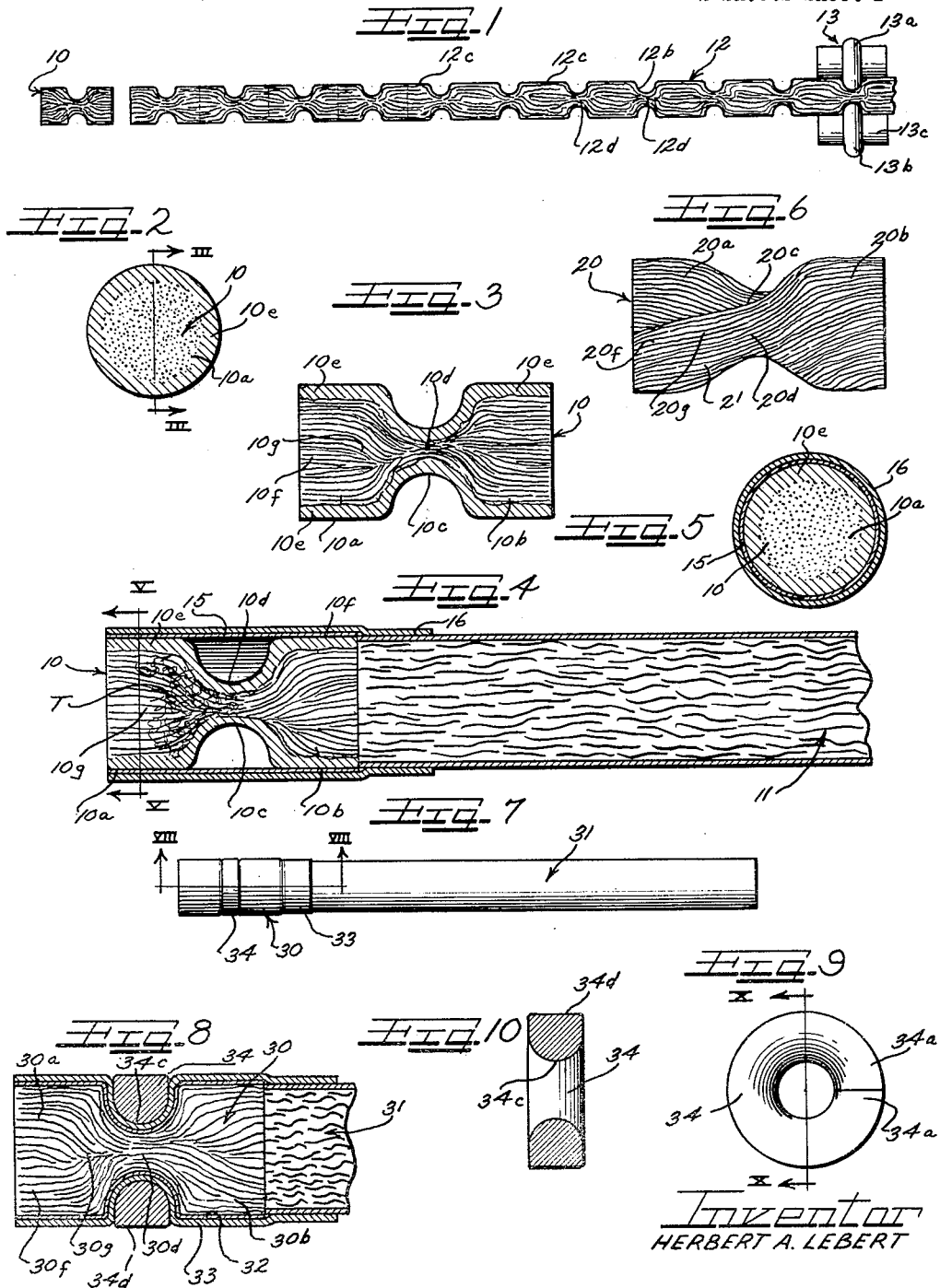

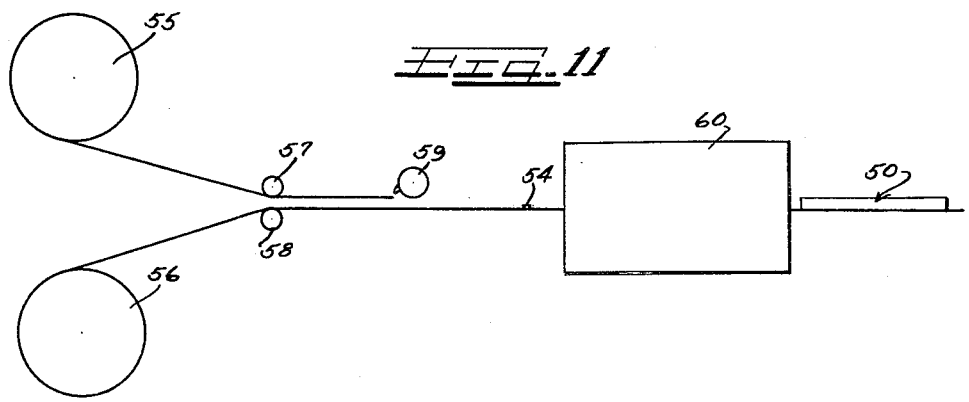
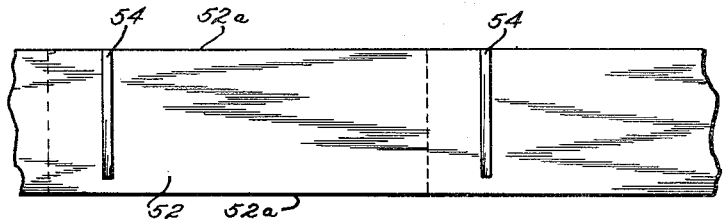
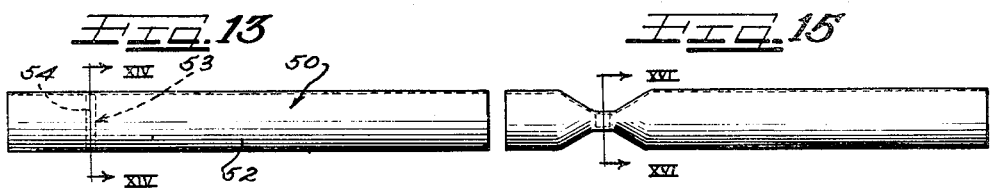
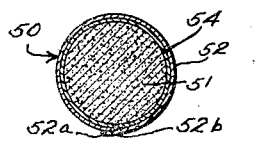
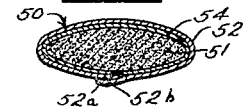
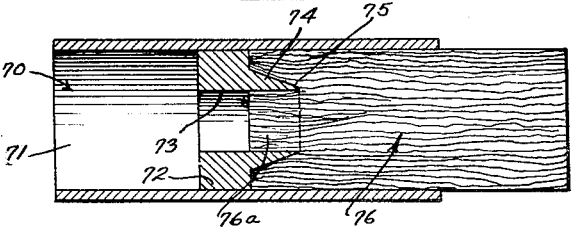

The present application is a continuation-in-part of application Serial No. 710,697 filed January 23, 1958, now abandoned.

The present invention relates generally to cigarette structures and a method of manufacturing the same. More specifically, the present invention relates to a filter tip construction and the method of manufacturing the same whereby the filter tip is provided with a venturi passageway area intermediate its length so that the velocity of smoke passing through the filter tip may be accelerated and tars in the smoke may be impinged upon fibers of the filter tip in a new and improved manner.

The majority of present day filter-tip cigarettes use cellulose filaments in varying amounts with various binders and additives. However, in spite of the many thousands of fine filaments, the filter tips still have considerable air space between the filaments for a 5/16" diameter filter tip can be compressed into a 1/8" diameter rod or bundle, that is, a reduction in cross-sectional area from approximately .07 square inch to .01 square inch or the equivalent of an air passage of approximately .06 square inch or 9/32" diameter. Such a large air passage is in marked contrast to the 1/32 inch or less orifice used to create high velocity-impingement tar collection according to the principles of my invention as set forth in my earlier filed copending application Serial No. 662,049, filed May 28, 1957, now Patent No. 2,954,772 dated October 4, 1960.

It is clear that the conventional filter tips trap or collect such tar as they do stop by virtue of the maze formed by the filaments and the circuitous path the smoke travels in passing along the length (approximately 9/16" of the filter tip).

In contrast to the above conventional filter tips the same fibrous stranded or cellulose stranded filter tip can be made to function as a venturi-impingement tar remover by constricting a narrow zone or section of the filter tip according to certain principles of my invention in the present application so that the aggregate of the air spaces left through the constircted area or zone will approximate a 1/32" diameter hole. Then as smoke is drawn through the constricted area or zone it will be greatly accelerated and then impinged on the barrier formed by the relatively loosely packed filaments confrontingly disposed downstream thereof with the tars thereby being extracted.

According to the present invention the principal object is to form a critical sized smoke passage or venturi which will speed up the smoke to a terrific velocity exceeding, e.g., one hundred feet per second so that the heavy (high temperature formed) tar molecules or particles will not be able to meander their way through the remaining relatively loosely packed strands of filter material, but will, instead impinge against and come to rest on the strands or filaments of filter tip material that confront or stand in their high speed, straight line path from the venturi passage. The lighter weight aromatic, low temperature formed smoke particles or fractions which go to make up a safe, enjoyable smoke will change their high-speed straight line path to conform to the devious paths formed by the spaces between the relatively loosely packed filaments that make up the filter tip.

Expansion cooling of tobacco smoke requires an elongated expansion chamber for the smoke to expand which structure is conventional in the art. According to the present invention the manufacturing cost of the filter tip may be kept to a minimum since the expansion chamber is not required and the dimensions of the conventional filter tips may remain substantially unaltered despite the inclusion of the critical passage area. Another advantage of the present invention is that a standard, conventional filter tip may be utilized and its method of manufacture may be varied only slightly so as to incorporate in the conventional filter tip the critical passage area as noted above.

If the conventional filter tip is provided with a venturi passageway area according to the principles of the present invention before it is attached with the cigarette proper, the attaching wrapper or paper will hide the construction so that the finished cigarette will appear identical to a conventional filter tip cigarette. This resemblance in appearance is the only similarity, however, since upon being tested by the smoker the improved taste will be immediately noted and if the filter tip is broken open after the cigarette has been smoked, the reason for the improved smoke will also be readily apparent in the substantially increased amount of tar accumulation therein.

If the filter tip construction is manufactured with an air passage area, for example, equivalent to an .028"–.032" diameter hole, much of the tars regarded harmful by modern medical thinking will be deposited that is, impinged on the filter tip filaments.

It is not possible to compress cigarette tobacco particles to the required degree for obtaining high velocity impingement action and have such degree of compression *hold its shape* solely thru the action of the compressed tobacco particles and its paper wrapper, as shown in the German Patent #188,091. A suitable band must be used or the cellulose must be fused or the tobacco particles will expand or tend to assume a normal noncompressed original position and the orifice area will become larger and thus no longer function as a high velocity impingement setup. It is for these reasons means must be provided on the cigarette to hold the desired orifice or venturi size.

The filter tips may be provided with the critical pasasgeway area by, for example, rolling the intermediate portion of the filter tip blank causing the diameter to be reduced and by heat fusing only the peripheral filter tip fibers, or, by twisting the filter tip fibers thereby reducing the intermediate portion thereof causing the diameter to be reduced thereby providing the critical passageway area, or, utilizing a crimping band to reduce the diameter of the intermediate portion of the filter tip blank with the blank when crimped serving to maintain the filter tip fibers in constricted relation, or by compressing tobacco fibers bearing a suitable pressure sensitive adhesive.

Accordingly, an object of the present invention is to provide a new and improved highly economical method of manufacturing filter tip elements and filter cigarettes. Still another object of the present invention is to provide a new and improved filter tip construction which is highly economical. A further object of the present invention is to provide a filter tip construction and method of manufacture which may be carried out so as to enable efficient large scale mass production of the same.

Other objects and features of the present invention will more fully become apparent in view of the following detailed description taken in conjunction with the accompanying drawings illustrating therein several embodiments and in which:

FIGURE 1 is a fragmentary schematic view of my method of manufacturing filter tips for cigarettes;

FIGURE 2 is an enlarged end elevation of one of the filter tips cut from the strip shown in FIGURE 1;

FIGURE 3 is an enlarged fragmentary cross-sectional view taken substantially on the line III—III of FIGURE 2 looking in the direction indicated by the arrows;

FIGURE 4 is an enlarged fragmentary cross-sectional view of the filter tip shown in FIGURE 3 in assembly with a cigarette;

FIGURE 5 is an enlarged fragmentary cross-sectional view taken substantially on the line V—V of FIGURE 4 looking in the direction indicated by the arrows;

FIGURE 6 is an enlarged side elevation of a modified filter tip construction;

FIGURE 7 is a side elevation of still another modified filter tip illustrated in assembly with a cigarette;

FIGURE 8 is an enlarged fragmentary cross-sectional view taken substantially on the line VIII—VIII of FIGURE 7 looking in the direction indicated by the arrows;

FIGURE 9 is an enlarged side elevation of a split-ring as shown in FIGURE 8;

FIGURE 10 is an enlarged cross-sectional view taken substantially on the line X—X of FIGURE 9 looking in the direction indicated by the arrows;

FIGURE 11 is a diagrammatic view of a method of manufacturing a modified type of cigarette;

FIGURE 12 is an enlarged fragmentary top elevation of a length of cigarette paper, as shown in FIGURE 11;

FIGURE 13 is a side elevation of a modified type of cigarette of the type produced by the method shown in FIGURE 11;

FIGURE 14 is a cross-sectional view taken substantially on the line XIV—XIV, as seen in FIGURE 13;

FIGURE 15 is a side elevation of a cigarette of the type shown in FIGURE 13 only with the metal band depressed to afford a high velocity-impingement area;

FIGURE 16 is a cross-sectional view taken substantially on the line XVI—XVI, as seen in FIGURE 15; and FIGURE 17 is a vertical sectional view of a filter tip cigarette and a venturi orifice creating structure.

The reference numeral 10 in FIGURES 1 through 5 indicates generally one form of a filter tip manufactured according to the principles of the present invention.

In FIGURE 4 a cigarette is indicated at 11 which cigarette is of the filter type and has the filter tip 10 in assembly therewith. The filter tip may be manufactured from any suitable materials such as cellulose, or other fibrous materials, and the like. In FIGURE 1 a mass of fibrous material may be disposed upstream of an extruder mechanism (not shown) with the fibrous material being actuated or forced through the extruder mechanism in a manner whereby a length or strip 12 of fibrous material such as cellulose is extruded which strip has a reduced cross-sectional dimension.

Downstream of the extruder (not shown) is a mechanism 13 for reducing the cross-sectional dimension of the strip 12 at predetermined instances along the length of the strip. In the illustrated form the mechanism 13 is suitably shown as a roller mechanism including rollers 13a and 13b which are preferably heated along with a roller mechanism portion 13c which serves to support the rollers 13a and 13b. This heated roller mechanism serves to constrict the diameter of the strip and operates to fuse only localized peripheral areas of the strip 12 as will hereinafter be described in further detail.

Each filter tip includes opposite end portions 10a and 10b which are separated from each other by an intermediate reduced portion 10c which has a reduced cross-sectional area or dimension as compared to the opposite end portions 10a or 10b. Extending longitudinally of the reduced intermediate portion 10c is a longitudinal passageway area 10d of critical dimension which passage area allows smoke to pass from the upstream end 10b of the filter tip to the downstream end 10a and then into the mouth of the smoker. The opposite end portions 10a and 10b and the intermediate reduced portion 10c each have annular peripherally localized fused areas 10e which operate to confine the smoke internally of the filter tip 10 in its longitudinal movement therethrough.

Each of the filter tips is comprised of a multiplicity of fibers 10f which fibers extend substantially the length of the filter tip 10. The portions of the fibers on the downstream side of the passageway area 10d provides an impingement area for the accumulation of tar particles as indicated at T in FIGURE 4.

According to the method aspects of the present invention, the extruder mechanism (not shown) may operate to extrude a stream or strip of fibrous material. The strip of material then passes through the roller mechanism 13 which constricts the strip forming annular grooves or depressions 12b there therein. By virtue of the fact the roller mechanism 13 is heated to a predetermined temperature only a peripherally localized area of the strip 12 is fused. Since the rollers 13a and 13b are heated and further since the rollers operate to constrict the material between segments 12c, link strip portions 12d are formed in a manner whereby the fibers at the areas of the link strip portions 12d are compacted and the overall passageway area between the fibers is maintained at a critical dimension.

Downstream of the roller mechanism 13 may be provided a cut-off mechanism (not shown) which mechanism operates to cut each of the strip segments 12c in half. Since the filter tip is peripherally fused along its length at its outer periphery, the compacted fibers along the link strip portion 12d between the longitudinal reduced portions 12c are sustained in their compacted position.

Thus, each of the filter tips 10 is peripherally sealed at localized areas to aid in maintaining the compacted fibers in their compacted position and to preclude the smoke from bypassing the longitudinal passageway 10d and jumping across the gap between the opposite end portions 10a and 10b at the outer periphery of the reduced diametered area 10c. As has been discussed above, the filter tip 10 may be heat glazed to fuse at least the peripheral surface at the dished area or each of the filter tips may be provided with a coated seal such as by spray painting or the like. In any event, the linking or intermediate portion has a multiplicity of minute interconnected spaces disposed between the fibers with the sum total of the cross-sectional areas of the spaces providing a venturi passageway falling within a critical range so the velocity of smoke passing through the filter tip may be effectively increased.

Each of the filter tips may be suitably provided with a peripheral layer comprised of paper or some other suitable material which layer is indicated generally at 15 in FIGURES 4 and 5. The peripheral layer 15 as illustrated comprises a tubular member and extends across the depressed area of the filter tip so that the filter tip may have a conventional cylindrical appearance. Each of the filter tips is then abutted against the cigarette 11 and a paper piece or wrapper 16 is wrapped around the periphery of the filter tip 10 and the cigarette 11 to connect them together (FIGURES 4 and 5).

In the past, the problem presented has been one of providing sufficient smoke flow to satisfy the smoker while at the same time removing the deleterious tars, etc. In the structure of the present invention, this problem is overcome by providing a venturi passageway area which greatly increases the velocity of the smoke stream passing through the filter tip so that when the stream strikes the barrier comprised of a multiplicity of fibrous strands such as cellulose, the tar is lodged and collected upon the peripheral surface of the fibrous strands and the resulting purified smoke alters its course through the strands and passes onto the smoker through the downstream end 10a of the filter tip 10. By referring to the removal of tars the term "tars" should be regarded as embracing tars, resins, and other harmful substances. While there will be variations in the size of the orifice or passageway area, depending upon the character of the smoke, the density of the cigarette mass, etc., in general effective results are obtained where the passageway area is equivalent to an orifice diameter of from .025 to .038 inch (square inch areas of .0005 to .001). Very satisfactory results have been obtained where the passageway area is equivalent to an orifice diameter of .028" to .032" (.0006 to .0008 square inch). As a preferred example, I have employed effectively a passageway area equivalent to an orifice having a diameter of .030 (.0007 square inch), which gives excellent tar removal and ease of drawing.

The operation resulting from the present compact filter tip structure shown herein is in contrast to the operation of existing filter tips and cooling devices heretofore employed with cigarettes where the passageway area is not controlled or where a relatively large expansion chamber is required. Such latter mentioned cooling devices bring about a peripheral cooling of the smoke but allow substantial core portions of the tars to pass onto the smoker without the tars being removed therefrom. In the present structure, the entire cross-section of the smoke stream is subject to the action of the impingement barrier comprising the downstream end 10a of the filter tip so that the tars and other harmful particles are removed by the foregoing high velocity impingement action upon the barrier.

The passage or orifice area is effective in greatly increasing the velocity of the smoke so that it is substantially in excess of 100 feet per second. Of course, the velocity will vary considerably with different smokers and cigarettes of varying degrees of density. By positioning the barrier 10g in confronting relation to the outlet and of the orifice area, the attained high velocity is effective in lodging the tar fractions directly upon the strands of filter tip material thereby removing them from the smoke.

In FIGURE 6 is shown a modified filter tip construction indicated generally by the reference numeral 20 which filter tip is comprised of a multiplicity of fibers of the type described previously. In this instance, the filter tip includes opposite end portions 20a and 20b which are separated from one another by an intermediate reduced portion 20c which has a reduced cross-sectional dimension or area as compared to the opposite end portions 10a or 10b. Extending longitudinally of the reduced intermediate portion 20c is a longitudinal passageway area 20d which passage area allows smoke to pass from the upstream end 20b of the filter tip to the downstream end 20a and then into the mouth of the smoker in such the same manner as in the first form shown in FIGURES 1–5. In this case, however, the intermediate portion 20c is reduced as a result of fibers 10f being twisted. This twisting of the filter tip collapses the intermediate portion thereof to provide the filter tip with a reduced passageway area 20d. By this method the spacing between the fibers at the intermediate reduced portion 20c is substantially reduced and the spiral twisting may be controlled in a manner whereby the passageway area will fall within the ranges previously set forth herein. The periphery of the filter tip may be heat treated and the like in the same manner as shown in FIGURES 1–5 enabling the twist in the filter tip to be retained so that the critical range may also be maintained. Downstream of the intermediate reduced passageway area 20d is provided an impingement barrier area indicated generally at 20g. The combination of the reduced passageway area 20d and the barrier area 20g enables smoke passing through the filter tip to pass through at high velocity and strike the impingement area thereby depositing tars on the fiber portions of the filter tip in the end portion 20a.

In FIGURES 7–10 is shown a third form of my invention wherein a filter tip is indicated at 30 and a cigarette at 31. In this instance, the filter tip may have its intermediate portion reduced either before or after it has been assembled with the cigarette 31. In any event, the filter tip 30 is provided with a first cylindrical sealing layer or wrapper 32 such as paper and a second cylindrical layer or wrapper is abuttingly engaged over the first layer 32. The layer 33 differs from the layer 32 in that it is of a longer longitudinal dimension. The layer 33 may be comprised of any suitable material and if desired may be in the form of an adhesive tape so as to enable ready attachment of the filter tip with the cigarette by frictionally adhering the layer or wrapper 33 to both the filter tip 30 and the cigarette 31.

A split ring 34 is in this form of my invention used to constrict or reduce an intermediate area of the filter tip 30. In other words, the split ring is opened up and disposed generally at the periphery of the filter tip whereupon split ring end portions 34a are pressed circumferentially toward one another which results in the constriction of the intermediate area of the filter tip. By this means opposite end portions 30a and 30b are separated from one another by an intermediate reduced filter tip portion 30c. It is in this manner the filter tip fibers are compacted at the intermediate area 30c to produce a passageway area 30d of critical dimension of the order described previously herein. Filter fibers 30f extend longitudinally of the fiber tip and the portions of the fibers which are disposed downstream of the intermediate reduced portion 30c comprise an impingement barrier area 30g so that when smoke is drawn through the filter tip the velocity of the smoke is increased as it passes through the intermediate portion 30c whereupon the high velocity smoke strikes the impingement barrier area 30g and the tar particles may be removed from the smoke in the same manner as is shown in FIGURE 4.

This band 34 may be disposed either inside or outside of the paper layers or wrappers and if it is disposed at the outer side of the layers, it may serve as an identifying band to distinguish the particular brand of cigarette from other commercial brands.

As is shown, the band 34 operates to create an annular groove intermediate the opposite end portions 30a and 30b of the filter tip. In the illustrated form the layers 32 and 33 are bottomed in the groove and the band 34 is disposed exteriorly of the layers 32 and 33 at the area where they are bottomed in the groove. To facilitate crimping of the filter tip the band 34 is provided with an internal annular rounded surface 34c which is abutted against the layers 32 and 33. The outer circumference of the band 34 is comprised of an annular relatively flat surface 34d so that when the band is crimped in assembly with the filter tip 30, the annular surface 34d is concentric with the peripheral surface of the layer 33 in longitudinal alignment therewith. By this means the external peripheral surface of the filter tip may be maintained unbroken so the lips of a smoker may engage with the filter tip in a conventional manner.

In FIGURES 11 and 12 is shown a method of manufacturing a new and improved type of cigarette 50, the cigarette 50 being illustrated in FIGURES 13–16, inclusive.

Before proceeding with the description of the method of manufacturing the cigarette 50, a description of the construction details of the cigarette is now presented.

The cigarette 50 is constructed in substantially the same way as a conventional cigarette in that it has shreds of tobacco or fibrous material or fibers 51 which are encased within a tube or wrapper of cigarette paper 52. The opposite transverse ends 52a–52 are adapted to be lapped with respect to one another and glued together at 52b in a conventional manner. (FIGURE 14).

Disposed internally of the cigarette is means 53 for effecting high velocity-impingement tar removal of harmful tobacco tars. The means, as illustrated, comprises a narrow metal band 54 which is preferably manufactured from aluminum or similar material which is capable of taking a set upon being compressed.

From a consideration of FIGURE 12 it will be noted the aluminum strips 54 do not extend the entire transverse dimension of the cigarette paper or wrapper 52. The reason for this is that when the cigarette paper 52 is rolled into tubular form, the opposite ends of the aluminum strip or band 54 may then be disposed in circumferentially confronting relation rather than in lapped relation. The band 54 is preferably flat since it operates better than a round aluminum or copper wire. The band may be disposed on the outside of the cigarette, if desired. A band of non-porous paper may be employed to cover the tar stained zone if desired. Since the tar stained paper does not give off tar when touched by the lips or fingers, many smokers desired to personnally observe the tar stains so they will know the tar removal means is functioning correctly.

The band 54 may be made from any suitable materials, and excellent results may be obtained by using Minnesota Mining & Mfg. pressure sensitive Scotch tape #428B Aluminum for it will take a set without spring back when a band of this material is compressed. The band may be $\frac{1}{16}$ inch wide and the location of the band on the paper wrapper may be varied. The band 54 should have at least a .007 inch thickness so that it will hold its shape when compressed. It will further be appreciated that the band 54 may be mounted on a filter or non-filtered cigarette. If the band is mounted on the cellulose tip area of a filter type cigarette, the band must be much stronger and heavier. It would probably be best to locate the compression band in the tobacco area and leave the cellulose tip round and free to serve as means to keep tobacco particles out of the smoker's mouth.

To operate the cigarette 50, a smoker lights the cigarette and he should then take a few puffs or drags to determine the normal draw resistance. The means 53 or band 54 may then be compressed until a slight increase in draw effort is produced. The orifice area is now in the .0005 to .001 sq. inch range as will be evidenced by tar stains appearing to the rear of the banded zone, i.e., the impingement barrier or zone. If the means 53 or band 54 is further compressed, a greater amount of tar may be extracted from the smoke. If the means 53 or the band 54 is compressed beyond the .0005 sq. inch area, the smoking of the cigarette will become more difficult since the draw effort will be greater than is normally desired by a smoker.

It will be noted in FIGURE 11 that an aluminum foil roll 55 is disposed adjacent to a cigarette paper or wrapper roll 56. The aluminum foil and the cigarette paper are adapted to rotate longitudinally of one another and suitable feed rolls 57 and 58 are provided in order to assist in the movement of these materials. Disposed downstream of the feed rolls 57 and 58 is a rotary (or punch) strip cutter 59. This cutter 59 acts as a cutoff in that it cuts a band 54 during each revolution. The cigarette paper may move 500 feet per minute past the cutter and as the cutter revolves the aluminum bands 54 are shot off of the aluminum foil roll against the cigarette paper 52. If plain aluminum is used which does not have an adhesive on it, a glue roller should be disposed just ahead of the cutter 59 to apply a strip of glue to the paper so that the band 54 will stick to the cigarette paper 52 when it strikes the paper.

Disposed downstream of the cutter 59 is a conventional cigarette machine 60. It will be noted the cigarette paper 52 having the spaced bands 54 on it enter the cigarette machine 60 as a flat strip. The machine 60 operates to contour the paper to form a trough for the receipt of tobacco fibers which are deposited in the trough. As the strip is moved through the machine the strip is further contoured until a round rod is formed and the overlapping ends 52a–52a are lapped and glued together. The long rod of material is then cut off at suitable intervals to form individual cigarette of the type indicated at 50.

The band 54 is hardly visible when it is disposed internally of the cigarette paper or wrapper 52. This band 54, when compressed as shown in FIGURE 15, provides high velocity-impingement means for assisting in the removal of tars from tobacco smoke in the manner as previously described herein.

An aluminum wire can be used instead of Minnesota Mining's Scotch aluminum tape as the material for the compression band. Tests have proven that a wire may be used. In a test Alcoa's number 1100 of $\frac{1}{32}$" dia. has been used. This wire was then placed thru a roll to flatten it so that it was about .010" thick and about $\frac{1}{16}$" wide. A piece about $\frac{15}{16}$" long was cemented to the inner surface of a cigarette paper and the cigarette rolled to standard form. When the banded area or zone was compressed so that the ellipse thus formed measured about $\frac{7}{16}$" wide by $\frac{1}{16}$" high (on the outside) the tar removal action was satisfactory. An important point is that the material must be completely soft or annealed for if it has hardness or springback it will be much harder to properly compress and hold to the needed compression so the desired tar may be removed by high velocity impingement.

As another modification, pressure sensitive adhesives may be applied as a coating to the cigarette fibers at a localized area between opposite ends of the cigarette. The tobacco particles are coated with pressure sensitive adhesive (or the cellulose filter tip strands) and then when pressure is applied to the adhesive zone (corresponding to the metal band zone) the tobacco particles (or cellulose strands) will adhere as required or determined by the pressure used to form the desired orifice space between tobacco particles or strands. Such adhesive is sprayed onto the fast moving tobacco stream at the proper intervals before said tobacco is rolled into a cigarette. By way of example, a continuous length of cigarette fibers may be sprayed with the adhesive at axially spaced intervals. After the edges of the paper or wrapper are lapped and glued, the stream of paper coated fibers may be cut into cigarettes.

*Proofs*

The extent of construction in all forms is not merely a matter of choice and while the specific density of the fibers and the degree of packing may vary greatly, especially between brands, the fact remains that the cigarettes may be readily tested to show that high velocity impingement tar removal has taken place after the cigarette has been smoked or that it will occur if the cigarette is smoked.

All the cigarette manufacturers cut up the tobacco leaves by shredding or cutting the tobacco into small ribbons as can be observed in any of the standard brands of cigarettes if they are broken open. I have made some measurements of these ribbons or shreds and from the following brands I had on hand (Camel—Chesterfield—Belair—Kent—Parliament—Winston) I can report that all are cut to a width of .8 mm. or about $\frac{1}{32}$" (in various lengths). Of course, the shreds or ribbons are pretty much averaged out as to length so that a uniform mixture does exist. There is a variation in ribbon thickness as the tobacco leaf varies out which is true in all brands. The important thing is that, regardless of the particle size or shape, the air space between particles must be reduced to aggregate an area of between .0005 and .001 sq. in. in order that the desired tar removal take place. This is done by the smoker to suit his taste as it may fall in the above range.

When the band 54 is used on a cigarette the tar stain on the paper immediately behind the band will quickly advise the smoker whether he is obtaining high velocity impingement tar removal for tar will appear only if the band has been sufficiently compressed so that at least the maximum orifice of .001 square inch. The orifice size may also be mathematically computed. When the band 54 is compressed, it is elliptical and the compressed zone is an ellipse. The area of an ellipse is equal to the product of its two axis times .7854. If a cigarette is compressed at the banded zone until tar impingement action is observed and the ellipse area measured by micrometer and then the banded zone is compressed some more or until closure occurs and the ellipse area again measured we can easily obtain the orifice area existing while tar was being deposited as such orifice area will be the difference between the two areas i.e. closed and open.

This method can be used on any brand of filtered or non-filtered cigarette, whether the cellulose tip area or in the tobacco area. When using the band around the tobacco particles we have an arrangement that gives the smoker a choice of a filtered smoke by compressing the band 54 to the desired extent. Actual weighings of the tar removed by compression or fusion of strands shows that the same amount of tar is removed for the various sized orifice openings as takes place when a nice round hole of between .025" dia. (.0005 sq. in. area) and .038" dia. (.001 sq. in. area) is used.

In the manufacture of filter tip cigarettes of the type shown in FIGURES 3 and 8, the orifice is factory set as compared to where a compressible band is provided. The smoker need not look for a tar stain on the cigarette paper. The degree or extent of area reduction or partial fusion is factory controlled as is the compression action if that construction is used. Such close control of degree of fusion or compression at the factory is possible for while the various brands of cigarettes will have various degrees of compaction of the cellulose strands in their tips the cigarettes of a given brand will be found to be very uniform. As examples: Winston tips will weigh 260 mg. per inch of tip length; Kents are 300 mg. per inch; Parliaments are 320 mg. per inch; Tareytons are 30 mg. per inch; L & M will be 380 mg. per inch while Belair will run 30 mg. per inch. The factory can thus determine the correct amount of area to leave unfused or the proper amount to compress the strands and thus turn out a uniform product. There is a variation between brands of cigarettes but a given brand tends to be consistent so that a factory fixed orifice made out of the cellulose filter strands is feasible if that construction is desired.

Numerous experiments and tests have demonstrated that variable smoke flow rates result from such factors as the degree of kink and twist in the cellulose strands, the amount and kind of filler material used, the strand denier and the like. These factors effect the flow friction so one cannot say that the cellulose strands must be compressed until the air space between strands is exactly equal in all cases to the orifice range of .0005 to .001 square inch. It can be demonstrated and proven that for the removal of the desired amount of high temperature formed tar we must have an effective orifice of between .0005 and .001 square inch area and if such effective orifice area is further reduced by .001 square inch so that the air flow is stopped or blocked we have then established that the pre-reduced orifice was within the claimed range.

In FIGURE 17 is a testing device for orifice area determination indicated at 70. The device 70 includes a tube or sleeve 71 made from a suitable material such as synthetic plastic. Secured within the sleeve 71 between its ends is a tubular disc 72 having a sleeve or disc opening 73 corresponding in area to the cross-sectional area of the particles cellulose strands and the spaces between them such as at the passageway area 10d in FIGURE 4. The disc 72 has a reduced end 74 with a knife edge 75 which is adapted to be telescopesd within a cellulose filter tip 76. The tip 76 may be identical to the tip 10 only without a reduced intermediate area 10c. Through the use of this device, it can be determined whether strands 76a which have not been compressed or fused will form the proper orifice. In other words, if a cigarette having the filter tip 76 is smoked while in assembly with the device 70, and if the desired amounts of tar are collected on the strands 76a in the core passageway 73, then filter tips of the same type or make can be fused or compressed by the bands 34 so as to leave an unrestricted area in the filter tip of the same diameter or area as the disc passageway 73. The best core size for several brands of cigarettes is as follows: Belair and Kent .120" dia. core hole; Winston .125" opening; Parliament .130" opening; L & M .145" core hole. The isolation without compression of a section of the cellulose tip of the size stated will remove the same amount of high temperature formed tar as would be removed by a single, round hole of the .005 to .001 square inch range and would tend to fall at the mid-point of that range i.e. .0007 sq. in. However, if a cigarette, by the nature of its filter, required a 130" dia. opening (.012 sq. in.) and a .120" dia. (.011 sq. in.) was used, the flow would cease i.e. the orifice action would not take place and no tar would be removed as no smoke flow could get thru the filter material in the .011 sq. in. zone. This clearly shows the existence of a passage of our range while the correct tar removal action was taking place.

In the structure shown in FIGURE 8 where all fiber strands are compressed, the following tests have been made on an L & M cigarette. The normal diameter is .312" or an area of .0767 when the cigarette is compressed to give the proper tar removal action, the diameter is reduced to .214" or an area of .0358 square inch. Then when the cigarette is compressed enough to stop flow the cigarette is further reduced to .210" diameter or an area of .0345 sq. in. It was thus established that before flow was stopped the area of the orifice was .0013 which is within the range necessary to obtain high velocity impingement for removal in accordance with this invention.

In a similar experiment on a Pall Mall the fibers under the band 54 were .0707 sq. in. (.300" dia.). Compression was then applied sufficient to stop flow reducing the area under the band 54 to .01227 sq. in. (.125" dia.). Before the band 54 was compressed to stop flow, the band 54, as compressed to produce a tar stain on the paper constituted an ellipse of .42" by .04" and had an area of .01319 sq. in. The difference of the orifice area of .01319 minus the orifice area of .01227 with flow stopped is .0009 sq. in. which is within the range necessary to produce high velocity impingement tar removal.

As will be observed in each form of the invention disclosed and more particularly from an inspection of FIGURES 3, 4, 8 and 15, the filter tip structure and cigarette in each instance has the body of fibrous filter material intermediately constricted to afford a smoke passageway venturi of a diameter inside of the restricting means not over about 1/3 the diameter of unrestricted portions of the filter material of the body at each end of the restriction passageway venturi. The restricting means in each instance partitions the unrestricted end portions of the body against smoke passage therebetween except through the venturi passageway within which smoke drawn is accelerated to issue at high-speed and impinge onto the fibrous material in the unrestricted body portion downstream from the venturi, thus attaining the desirable objects of the present invention.

Until the banded area of the pressure sensitive adhesive is compressed so that an orifice area of about .001 sq. inch is formed there will be little or no tar deposited on the tobacco particles directly in back of the compressed area that is the impingement barrier and if the banded area is compressed to the extent that the orifice area is less than .0005 sq. inch the cigarette will have too hard a draw.

In each form a structure is provided having a single orifice made up of the many contiguous spaces between the tobacco particles in an ordinary cigarette and between the cellulose strands in the case of a cellulose tip. In each form the tars are removed by high velocity impingement for if the cigarette is cut off directly in back of the compressed zone, and then smoked, no tar stalactites are formed thus showing that we do not have a series of holes smaller than .025" diameter which are capable of tar formation as shown in the prior art.

It will be understood that modifications and variations may be effected without departing from the scope of the novel concepts of the present invention.

I claim as my invention:

1. In a cigarette, a self-contained assembly comprising a tubular wrapper, a body of fibrous material in said wrapper longitudinally oriented for smoke passage longitudinally through the cigarette, and means comprising an aluminum band located inside of and secured to said wrapper, said means being disposed to compress a limited longitudinal portion of said body to thereby compactingly compress the body fibers into a venturi restriction passageway through which smoke must travel at an accelerated high speed when moving from a downstream to an upstream side of the constriction, the fibers of the body on the downstream side of the constriction providing impingement barrier against which the high speed smoke impinges, whereby high temperature tars are collected on the barrier fibers and the smoke then moves on downstream through the body minus such tars.

2. In a cigarette, a self-contained assembly comprising a tubular wrapper, a body of fibrous material in said wrapper longitudinally oriented for smoke passage longitudinally through the cigarette, and means comprising an annular metal band having opposite ends confronting one another, the band being located inside of and secured to the inside of said wrapper, said means being disposed for manual actuation for compressing a limited longitudinal portion of said body to thereby compactingly compress the body fibers into a venturi restriction passageway through which smoke must travel at an accelerated high speed when moving from a downstream to an upstream side of the constriction, the fibers of the body on the downstream side of the constriction providing impingement barrier against which the high speed smoke impinges, whereby high temperature tars are collected on the barrier fibers and the smoke then moves on downstream through the body minus such tars.

3. In a cigarette, a self-contained assembly comprising a tubular wrapper, a body of fibrous material in said wrapper longitudinally oriented for smoke passage longitudinally through the cigarette, and means comprising a generally circular metal band located inside of and secured to said wrapper, said circular band being manually compressible from annular to elliptical form to thereby compactingly compress the body fibers into a venturi restriction passageway through which smoke must travel at an accelerated high speed when moving from a downstream to an upstream side of the constriction, the metal being of such a characteristic as to take a set after being compressed so as to maintain the fibers in a compacted position, the fibers of the body on the downstream side of the constriction providing an impingement barrier against which the high speed smoke impinges, whereby high temperature tars are collected on the barrier fibers and the smoke then moves on downstream through the body minus such tars.

4. A method of manufacturing a filtering unit comprising the steps of securing metal strips transversely of a length of wrapping material and extending substantially the width of the wrapping material at longitudinally spaced intervals along the length of a length of wrapping material, depositing fibers on the wrapping paper, rolling the wrapping material about the fibers disposing the metal strips in annular form, dividing the thus formed length of wrapping paper into a series of filtering units with each of the units having a transverse strip, and compressing the metal strip causing the metal strip to take a set thereby compacting the fibers disposed internally of the metal strip forming a venturi restriction passageway through which smoke must travel at an accelerated high speed when moving from a downstream to an upstream side of the strip, the fibers of the body on the downstream side of the restriction providing impingement barrier against which the high speed smoke impinges, whereby high temperature tars are collected on the barrier fibers and the smoke then moves on downstream through the cigarette minus such tars.

References Cited in the file of this patent

UNITED STATES PATENTS

| | | |
|---|---|---|
| 191,501 | Willis | May 29, 1877 |
| 1,282,014 | Krummling | Oct. 15, 1918 |
| 1,393,524 | Grupe | Oct. 11, 1921 |
| 1,555,320 | Weil | Sept. 29, 1925 |
| 2,192,569 | Williams | Mar. 5, 1940 |
| 2,402,680 | Schmitt | June 25, 1946 |
| 2,407,484 | Ehrhardt | Sept. 10, 1946 |
| 2,669,996 | Berriman | Feb. 23, 1954 |
| 2,854,985 | Watkins | Oct. 7, 1958 |
| 2,869,883 | Dunbar | Jan. 20, 1959 |
| 2,954,773 | Lebert | Oct. 4, 1960 |

FOREIGN PATENTS

| | | |
|---|---|---|
| 188,091 | Germany | July 11, 1907 |
| 240,987 | Switzerland | June 1, 1946 |